Feb. 10, 1970  R. BINDER ET AL  3,494,225
HOUSING INTERCONNECTIONS FOR VEHICLE DRIVE
Filed May 3, 1968  2 Sheets-Sheet 1

Inventors:
ROBERT BINDER & OTTO HAUSINGER
By: Craig & Antonelli
ATTORNEYS:

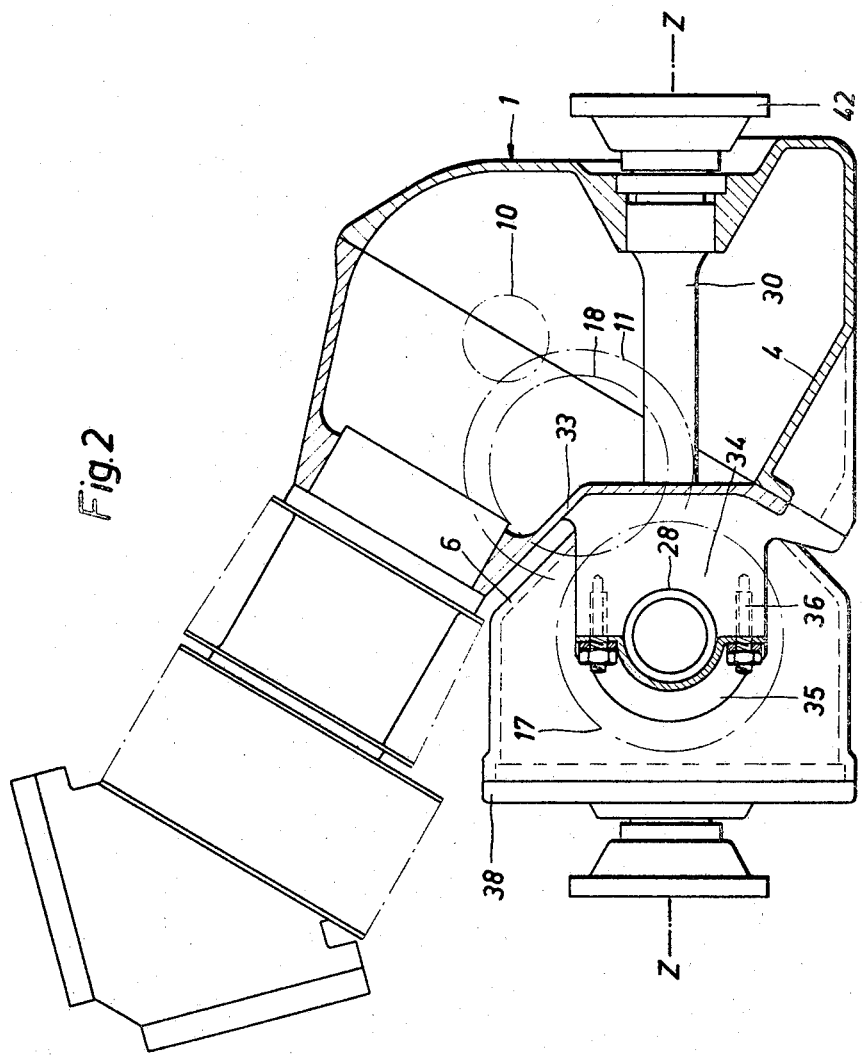

_United States Patent Office_

3,494,225
Patented Feb. 10, 1970

3,494,225
HOUSING INTERCONNECTIONS FOR VEHICLE DRIVE
Robert Binder, Schwieberdingen, and Otto Hausinger, Gerlingen, Germany, assignors to Firma Dr.-Ing. h.c.F. Porsche K.G., Stuttgart-Zuffenhausen, Germany
Filed May 3, 1968, Ser. No. 726,467
Claims priority, application Germany, May 3, 1967, 1,630,930
Int. Cl. F16h 37/08
U.S. Cl. 74—700          10 Claims

ABSTRACT OF THE DISCLOSURE

The differential housing is provided with a cylindrical extension received within a cylindrical bearing portion of the engine housing, which cylindrical extension is opposite from and coaxial with an intermedate shaft connecting the gear transmission output and the differential, which shaft is parallel to and spaced from the engine crankshaft; the differential housing and engine housing having a further plug-in connection concentric with the axis of the differential ouput shafts. The transmission housing and differential housing have guide pins for their alignment. The transmission output and intermediate shaft have axially engageable plug-in type splines.

BACKGROUND OF THE INVENTION

It is conventional to provide a vehicle with a drive unit having an internal combustion engine, a change-speed gear transmission and a differential gear arrangement combined in a block-type housing wherein the axle output shafts of the differential extend generally perpendicular to the engine crankshaft and are disposed at the level of the engine housing; the differential being driven by an intermediate shaft connected with the transmission output and extending parallel to the crankshaft. In a known drive unit of this type, the differential housing is provided beside or beneath the internal combustion engine and has flange-like connecting surfaces; the differential housing is attached to a corresponding counter surface of the engine housing by a plurality of screws or bolts. Although such a mounting is quite simple, it has the considerable disadvantage that even with a careful assembly by means of appropriate gauges or calipers, it is impossible to achieve an aligned driving connection between the rotatable output of the transmission and the rotatable input of the differential gear arrangement. Flexible couplings are usually provided between these rotatable members such as shown in German Patent 816,480 to compensate for errors in alignment of these rotatable members, because minor differences in alignment are sufficient to make meshing of the corresponding teeth uncertain.

In a drive unit according to British Patent 1,003,863, the change-speed gear transmission and the differential gear are combined in a housing mounted to the engine housing. However, an adjustable type shaft connection provided with crowned or cambered tooth meshing on the gear input side is required, which is disadvantageous because of the considerable expense involved. Furthermore, for covering the friction clutch coupling between the engine and the change-speed gear transmission, a separate lid is required permitting a certain longitudinal compensation.

SUMMARY OF THE INVENTION

In contrast to the above, it is an object of the present invention to provide a detachable mounting and centering of the differential gear housing at the adjoining parts of the engine housing and change-speed gear transmission housing, affording an aligned shaft connection between the differential and transmission, without auxiliary compensating means.

This is accomplished, in accordance with the present invention, by inserting the differential gear housing in the engine housing by means of a plug connection concentric with the axis of rotation of the differential axle shafts, and by providing a further mounting between a cylindrical extension of the differential gear housing and a corresponding cylindrical bearing of the engine housing, which are coaxial with the intermediate shaft that drivingly connects the differential with the transmission. With such an arrangement, the bearings for the intermediate shaft, the transmission output and the differential housing may be manufactured in one direction, namely in parallel to the axis of rotation of the crankshaft, whereby alignment errors are avoided. Since the cylindrical bearing between the differential gear housing and the engine housing permits a certain amount of longitudinal play or compensation between it and the plug-type connection between the differential housing and engine housing, the assembly is quite simple and can be performed by relatively unskilled labor without specific training, which is particularly advantageous with respect to mass production.

A particularly secure mounting for the differential gear housing and a concomitantly simple construction from an assembly point of view is obtained by providing the differential housing cylindrical extension opposite from the differential housing bearing supporting the intermediate shaft, with respect to the axis of the differential axle outputs. Preferably, the differential gear housing is connected with the adjacent transmission housing by means of gauging flanges having guide pins accurately spaced from the intermediate shaft axis of rotation. Thereby, alignment of the transmission housing and the differential housing is obtained with respect to the axis of rotation of the intermediate shaft, so that any possible alignment errors will be between the engine crankshaft and the transmission gear input shaft, which may be compensated for simply by means of a disengageable clutch for the transmission. A particularly simple disassembly of the differential gear is made possible by extending the intermediate shaft from an axially fixed connection with the differential housing into the transmission housing wherein it is axially disengageably connected with the transmission output by means of a plug-type connection, particularly a splined connection.

BRIEF DESCRIPTION OF THE DRAWING

Further objects, features and advantages of the present invention will become more clear from the following detailed description of a preferred embodiment shown in the attached drawing, wherein:

FIGURE 2 is a partial cross sectional view taken along line II—II of FIGURE 1.

DETAILED DESCRIPTION OF THE DRAWING

Figure 1:
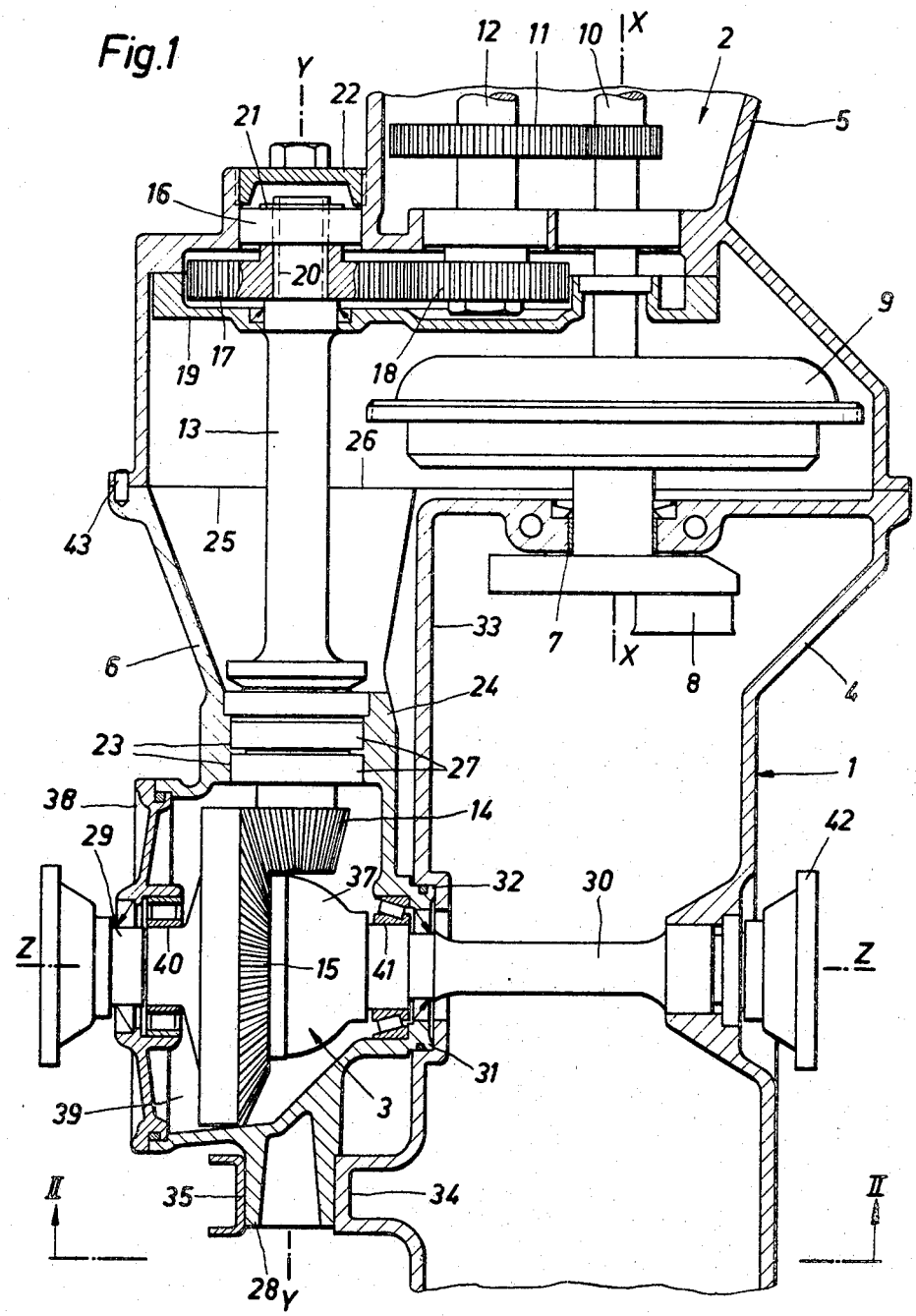
FIGURE 1 is a horizontal, longitudinal cross sectional view through the drive unit for an automotive vehicle employing a differential gear housing with mounting and centering according to the present invention.

As shown in the drawings, the vehicle drive unit includes an internal combustion engine 1, a change-speed gear transmission 2, and a differential gear arrangement 3, provided respectively with individual housings 4, 5 and 6 which are operatively combined together to form a single block. The engine housing 4 is provided with suitable bearings, including bearing 7, for rotatably supporting a crankshaft 8, which is only partially shown because the engine may be of conventional construction. The crankshaft 8 forms the output shaft of the engine that rotatably drives the disengageable clutch 9 for in turn driving the input member or input shaft of the change-speed gear transmission 2; the clutch 9 not being shown in detail, because it may be of conventional construction although preferably provided with a certain amount of radial play to compensate for shaft misalignment. The input shaft 10 is suitably rotatably mounted by means of bearings within the transmission housing 5 for rotation about the axis X—X coaxial with the crankshaft 8. In a conventional manner, gear pairs 11 (only one being illustrated for purposes of simplicity) selectively form a driving connection between the input shaft 10 and the counter shaft 12 of the gear transmission for selective speed change.

An intermediate shaft 13 provides the driving connection between the transmission 2 and the differential gear arrangement 3, which shaft has an axis of rotation parallel to and spaced from the crankshaft 8. At one axial end, the intermediate shaft 13 carries the bevel drive pinion for the bevel gear 15 of the differential, which differential may be of conventional construction and has not been shown in detail. By means of bearing 16, the transmission housing 5 rotatably carries the output member or spur gear 17, which is in constant meshing engagement with the spur gear 18 secured to the counter shaft 12. The gears 17 and 18 rotate in a space enclosed by their respective bearings and the cover 19. The opposite end of the intermediate shaft 13 is drivingly connected with the output member 17 by means of an axially disengageable plug connection in the form of an axial spline connection 20, which is secured by means of the clamping ring 21 accessible through the cover 22 threaded into an appropriate aperture in the transmission housing 5. The bearing bore 23 is provided in the neck portion 24 of the differential housing 6 for mounting therein the intermediate shaft 13. The neck portion 24 flares into a flanged surface 25 engaging a correspondingly flanged counter surface 26 of the transmission housing 5. Roller bearings 27 rotatably mount and axially secure the intermediate shaft 13 within the bearing bore 23.

On the opposite side of the differential housing 6, there is provided a cylindrical extension coaxial with the axis of rotation Y—Y of the intermediate shaft 13, which is at right angles to and intersects the axis of rotation Z—Z of the differential axle output shafts 29, 30. A plug-in connection is provided between the differential housing 6 and the engine housing 4 by means of a cylindrical collar 31 concentric with the axle shaft output 30 and telescopically received within the correspondingly cylindrical recess 32 within the side wall 33 of the engine housing 4. The cylindrical extension 28 is received within a correspondingly cylindrical bearing block 34 integral with the side wall 33 of the engine housing 4. The cylindrical extension 28 is held securely within the bearing block 34 by means of an arcuate rigid strap 35 secured to the engine housing 4 by means of screws, bolts or the like 36.

The rigidly interconnected conventional bevel gear 15 and differential cage 37, which contain the conventional differential bevel gears (not shown), are assembled within the otherwise integral differential housing 6 through an opening 39 normally sealingly closed by means of the removable wall 38. The wall 38 is provided with a roller bearing 40 for rotatably supporting the axle shaft output 29 and the collar 31 has therein the roller bearing 41 for rotatably supporting the other axle shaft output 30. The axle shaft output 30 extends through the engine housing 4 and is connected by means of an axially disengageable plug connection with the coupling element 42 for driving connection with wheel drive shaft (not shown).

During assembly of the above-described unit, the individual housings 4, 5 and 6 are aligned by means of the cylindrical guide pins 43 tightly received within correspondingly shaped aligned bores in the connecting flanges between the respective housings, which pins 43 are parallel with and accurately spaced with respect to the axis of rotation Y—Y, with only one of these pins 43 being shown for purposes of illustration. The pins 43 extend across the parting line formed by the flange surfaces 25 and 26.

In order to disassemble the unit and remove the differential gear housing 6, the cover 22 is unscrewed and removed, the clamping ring 21 is removed from the end of the intermediate shaft 13 thus releasing the latter, and the connecting bolts extending through the flange surfaces 25, 26 (which bolts are not shown) are loosened. Thereafter, the strap 35 is removed from the cylindrical bearing portion 34 and subsequently the housing 5 is pulled apart from the housings 4 and 6 until the intermediate shaft 13 slides out of engagement with the gear 17 associated therewith. Thereafter, the differential gear housing 6 may be moved away from the engine housing 4 thus moving the collar 31 out of the recess 32 and axially disengaging the axle shaft output 30 from its associated coupling member 42. The assembly of the differential gear housing is performed in substantially the same manner, with the reverse sequence.

The above described drive unit may be employed with vehicles having either a front engine or a rear engine. With differential gears of heavy vehicles, the neck portion of the differential gear housing may be mounted to the engine housing by means of an additional bearing block for further rigidity.

We claim:

1. A drive arrangement for a vehicle, comprising: an internal combustion engine having an engine housing and an output shaft with an axis mounted for rotation within said engine housing; a change speed gear transmission arrangement having a housing and a rotatably mounted input member substantially concentric with and drivingly connected with said engine output shaft, and a rotatably mounted transmission output member having an axis of rotation parallel with and spaced from said engine output shaft axis; a differential gear arrangement provided with a housing and therein a differential with opposed axle shaft outputs having axes of rotation extending generally perpendicular to the engine output shaft axis; intermediate shaft means forming a driving connection between said transmission output member and said differential, with an axis of rotation spaced from and substantially parallel with said engine output shaft axis; said engine housing and said differential housing having a plug connection with an axis of connection movement substantially coincident with the axis of rotation of said differential output shafts, and a second connection provided by a cylindrical differential housing extension portion concentric with said intermediate shaft axis received within a correspondingly cylindrical bearing portion of said internal combustion engine housing.

2. The device of claim 1, wherein said differential gear housing includes a bearing rotatably mounting said intermediate shaft means and wherein said cylindrical differential housing extension portion is on the opposite side of said differential gear housing from said intermediate shaft means bearing with respect to the axis of the differential gear axle shaft outputs.

3. The device of claim 2, wherein said differential gear housing and said change speed gear transmission housing have engaging connecting flanges provided with aligned bore pairs extending parallel to said intermediate shaft means axis with cylindrical alignment guide pins secured therein.

4. The device of claim 3, wherein said intermediate shaft is axially fixed within said differential gear housing and extends axially into said transmission gear housing; said intermediate shaft means and said transmission output member having an axially disengageable plug-type coupling.

5. The device of claim 1, wherein said differential gear housing and said change speed gear transmission housing have engaging connecting flanges provided with aligned bore pairs extending parallel to said intermediate shaft means axis with cylindrical alignment guide pins secured therein.

6. The device of claim 5, wherein said intermediate shaft is axially fixed within said differential gear housing and extends axially into said transmission gear housing; said intermediate shaft means and said transmission output member having an axially disengageable plug-type coupling.

7. The device of claim 1, including a disengageable clutch forming the driving connection between said transmission input member and said engine output shaft, and said clutch being provided with a substantial amount of radial play to compensate for shaft misalignment.

8. The device of claim 1, wherein said plug-in connection between said differential gear housing and said engine housing includes a cylindrical collar on one of said housings and a cylindrical recess in the other of said housings telescopically receiving therein said cylindrical collar with limited axial play and concentric with the axle shaft outputs.

9. The device of claim 1, wherein said differential gear arrangement has a bearing for one end of said intermediate shaft provided within a bearing portion of said differential gear housing; said bearing portion of said differential gear housing, the plug-in connection portion of said differential gear housing and said cylindrical differential housing extension portion all being of a homogeneous one-piece construction.

10. The device of claim 1, wherein one of said axle shaft outputs extends through said engine housing.

References Cited

UNITED STATES PATENTS

| | | | |
|---|---|---|---|
| 2,913,927 | 11/1959 | Issigonis | 74—701 |
| 3,052,313 | 9/1962 | Hooven | 180—55 |
| 3,122,944 | 3/1964 | Boehner et al. | 74—700 |
| 3,150,543 | 9/1964 | Dangauthier | 74—700 |

FOREIGN PATENTS 912,675  12/1962  Great Britain.

LEONARD H. GERIN, Primary Examiner

U.S. Cl. X.R.

180—75